F. MELUGIN.
EGG CONTAINER.
APPLICATION FILED APR. 3, 1917.
1,248,369.
Patented Nov. 27, 1917.
2 SHEETS—SHEET 1.
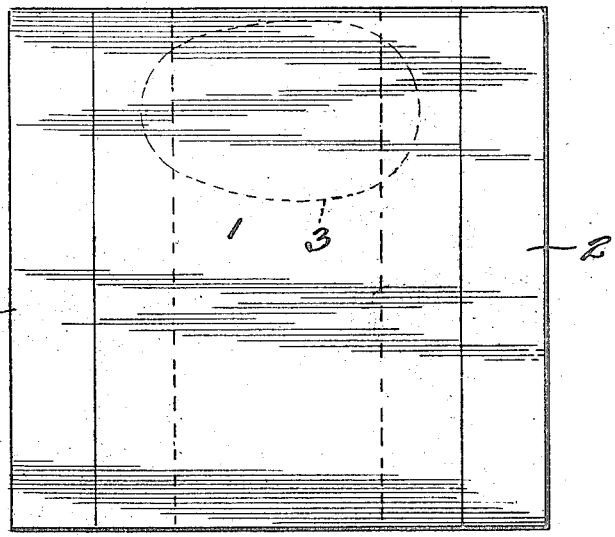
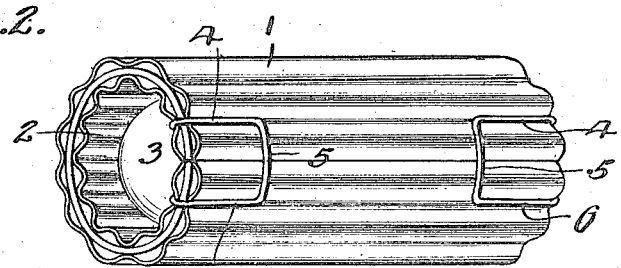
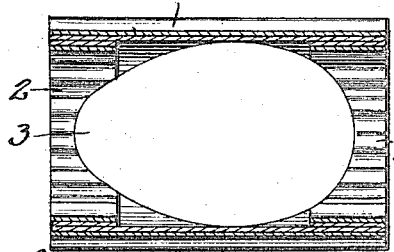
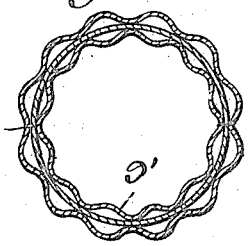
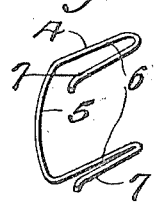
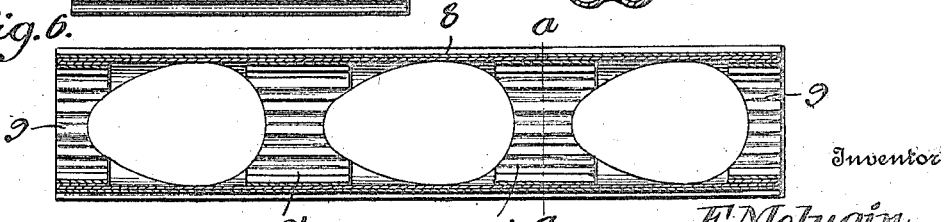
Witness
Inventor
F. Melugin
By Victor J. Evans
Attorney

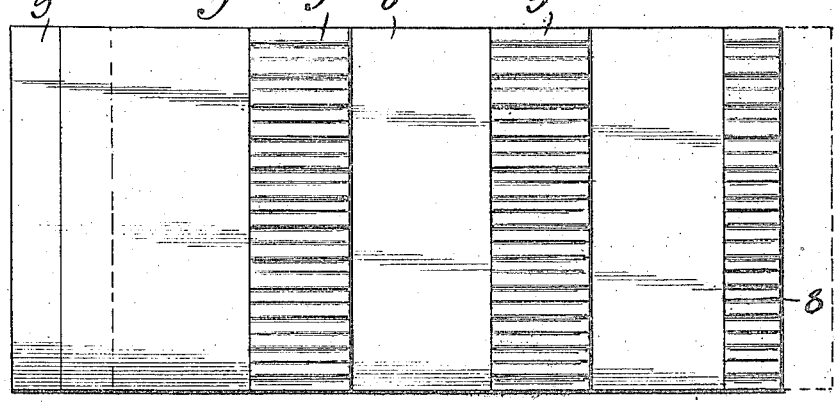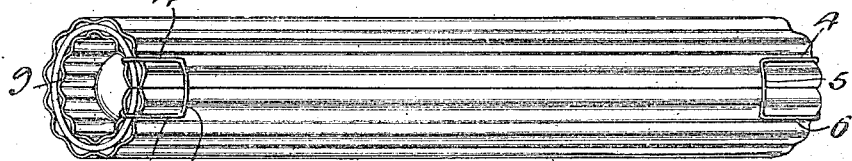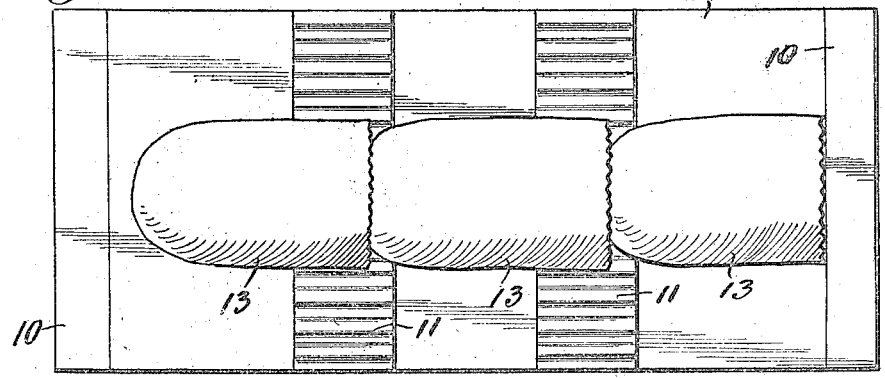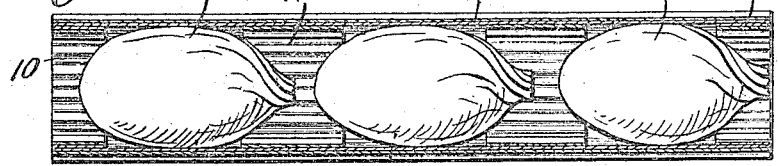

UNITED STATES PATENT OFFICE.

FRANK MELUGIN, OF REEDS, MISSOURI.

EGG-CONTAINER.

1,248,369.

Specification of Letters Patent.

Patented Nov. 27, 1917.

Application filed April 3, 1917. Serial No. 159,544.

*To all whom it may concern:*

Be it known that I, FRANK MELUGIN, a citizen of the United States, residing at Reeds, in the county of Jasper and State of Missouri, have invented new and useful Improvements in Egg-Containers, of which the following is a specification.

This invention relates to improvements in a container for use in shipping by mail or express small quantities of fragile products, such as eggs, and is directed particularly to a container adapted for the shipment of eggs from the raiser or merchant to the consumer.

An object of the invention is to produce a container which shall be of a simple construction, cheap to manufacture and one wherein the eggs may be safely nested without danger of contacting one with the other and also held to protect the same from any shock or jar to which the container may be subjected.

With the above and other objects in view the improvement resides in the construction, combination and arrangement of parts set forth in the following specification and falling within the scope of the appended claims.

In the drawings:

Figure 1 is a plan view of a container adapted to receive a single egg,

Fig. 2 is a perspective view of the container when rolled to tubiform,

Fig. 3 is a central vertical longitudinal sectional view through the same, showing the manner in which the egg is arranged within the container, the egg being in elevation, Fig. 4 is a plan view of a container adapted to receive a number of eggs, Fig. 5 is a perspective view of a container rolled or folded to tubiform, Fig. 6 is a central vertical longitudinal sectional view through the same, Fig. 7 is a horizontal sectional view approximately on the line *a—a* of Fig. 6, Fig. 8 is a plan view of the container provided with bags or receptacles to receive each an egg, Fig. 9 is a central vertical longitudinal sectional view through the same after the container has been folded to tubiform and the eggs incased in the bags, the eggs being shown in elevation, and Fig. 10 is a perspective view of one of the connecting or securing elements for the meeting edges of the container, to hold the said container in a tubiform.

In carrying out my invention I provide a substantially rectangular strip of foldable material, 1, such as pasteboard or the like, and preferably the said strip is provided with a facing of corrugated material. I score the said strip adjacent its opposite ends and cut the corrugated facing in a line with the said score and bend the same upon the score lines inwardly to provide transverse ribs 2 which are adapted to lie flat against the inner face of the strip. The ribs 2 are spaced a distance away from each other sufficient to receive one the point and the other the butt of an egg 3 and the strip is of a width so that when the same is folded to tubiform the ribs will frictionally contact with the egg preventing the same from moving edgewise in the tube and holding the egg away from the ends of the tube. When the strip is folded to tubiform I provide a securing element for the meeting edges of the same which is broadly indicated by the numeral 4 and which is preferably constructed of a single strip of wire comprising a central arched portion 5 having angularly extending legs 6 which are bent over themselves providing outer legs 7 and the outer legs 7 are spaced away from the inner legs 6 a distance only sufficient to permit of the insertion of the legs longitudinally of the tube to the opposite sides of the meeting edges thereof. As the securing element is constructed of wire, the legs necessarily embody a desired amount of resiliency and are adapted to exert a tension toward each other, and consequently the legs will compress the portions of the tube with which they engage and so insure the connecting of the edges of the tube as well as the locking of the securing elements upon the tube.

The above structure is illustrated in Figs. 1 to 3 inclusive, and in Figs. 4 to 6 inclusive I have illustrated a device substantially similar to that described except that the rectangular strip or sheet of foldable material, indicated by the numeral 8 is of a greater length than that previously described. The strip is preferably corrugated, ribbed or fluted upon its outer face, and has its end scored transversely and bent over the smooth inner face providing what I will term ribs and which are indicated by the numerals 9. These ribs may be pasted or otherwise secured to the smooth face of the strip if desired. At suitable spaced intervals I paste or otherwise secure upon the inner and smooth face of the strip 8 a series of transversely arranged ribbed, corrugated or fluted members which I will term the intermediate ribs of the structure and which are indicated by the numerals 9′. The ribs 9′ are spaced away from each other as well as being spaced away from the end ribs 8 a distance sufficient to provide what I term a plurality of nests whereby a number of eggs may be arranged one to have its point received upon the end rib of the structure and the other or outer egg having its butt received upon the opposite end rib of the device, and the points and butts of these eggs received upon the ribs immediately next to or adjacent the said end ribs and likewise the intermediate eggs will have their respective points and butts received upon the adjacent respective intermediate ribs. When the eggs are so placed the strip is folded to tubiform and it is to be noted that the strip is of a width sufficient only to permit of its meeting edges to contact when the eggs will snugly and fully engage with the ribs. Thereafter the securing elements heretofore referred to are applied and when the proper address is inscribed upon the tube the same may be shipped by express or through the mails as desired.

In the remaining figures of the drawings the structure is substantially similar to that just described, but upon one of the end ribs 10 and at a suitable distance from one of the edges of each of the intermediate ribs 11 of the sheet 12 I secure, by pasting or in any other desired manner, a sack or bag 13. Each of these bags 13 is of a greater length than the egg 14 which it is adapted to receive, whereby the open mouth of the sack or bag may be twisted upon itself to hold an egg therein, and this twisted end may be secured if desired. The sheet is folded to tubiform and secured by the means previously described, and with this construction it will be noted that should any of the eggs in the sacks be broken from any unforseen cause the contents of the egg will be held in the said bag or sack and so will not drip upon or otherwise interfere with the remaining eggs in the remaining sacks or bags.

In all of the constructions it will be noted that the end eggs are held a suitable distance away from the open ends of the tubes, and if desired caps or other closures may be provided for the said open ends, but in any event the end eggs cannot be contacted with except by the insertion of an instrument a suitable distance through the end of the said tubes.

From the above description, taken in connection with the accompanying drawings, the simplicity of the device as well as the advantages thereof will, it is thought, be perfectly apparent to those skilled in the art to which such invention appertains without further detailed description.

Having thus described the invention, what I claim is:

1. An egg container comprising a rectangular sheet of flexible material which is bent upon itself upon its ends to provide cushion ribs and which has secured thereon transversely extending spaced cushion ribs disposed to receive the point and butt of an egg and to sustain the point of one of the eggs out of contact with the butt of the adjacent eggs, said sheet adapted to be folded to tubular form around the eggs to have the ribs thereof frictionally engage with the eggs to prevent the lengthwise movement of the eggs, and spring members each comprising an arcuate body portion having angularly extending spaced legs which exert a tension toward each other and said legs adapted to be arranged over the ends of the tube to the opposite sides of the meeting edges of the tube.

2. A container for eggs constructed from a rectangular strip of flexible material having transversely arranged ribbed cushion members at its ends and intermediate of its ends, a plurality of alining sacks secured to the rectangular strip between the ribbed cushion members, each of said sacks being of a length each to receive an egg and to have its mouth twisted around the egg to permit of the butt of one egg resting against one of the cushion members and the point thereof resting against the adjacent cushion member and said strip adapted to be rolled around the sacks containing the eggs whereby when the edges of said sheet meet, the cushion members will be compressed against the sacks and against the eggs in the sacks to hold the said eggs against lengthwise movement in the sacks, and spring clips for connecting the ends of the rolled sheet.

In testimony whereof I affix my signature in presence of two witnesses.

FRANK MELUGIN.

Witnesses:
 M. P. FISHBURN,
 W. C. HAMILTON.

Copies of this patent may be obtained for five cents each, by addressing the "Commissioner of Patents, Washington, D. C."